United States Patent
Berta

(10) Patent No.: US 10,676,035 B2
(45) Date of Patent: Jun. 9, 2020

(54) GLOVE COMPARTMENT

(71) Applicant: Dr. Ing. h.c. F. Porsche Aktiengesellschaft, Stuttgart (DE)

(72) Inventor: Christian Berta, Calw (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 11 days.

(21) Appl. No.: 16/039,807

(22) Filed: Jul. 19, 2018

(65) Prior Publication Data

US 2019/0023187 A1    Jan. 24, 2019

(30) Foreign Application Priority Data

Jul. 21, 2017    (DE) .................. 10 2017 116 544

(51) Int. Cl.
| | |
|---|---|
| *B60J 7/06* | (2006.01) |
| *E05B 83/30* | (2014.01) |
| *B60R 7/06* | (2006.01) |
| *B60R 11/00* | (2006.01) |

(52) U.S. Cl.
CPC ............. *B60R 7/06* (2013.01); *E05B 83/30* (2013.01); *B60R 2011/0005* (2013.01)

(58) Field of Classification Search
CPC ..... B60R 7/06; B60R 2011/0005; B60R 7/04; E05B 83/30
USPC ...................................................... 296/37.12
See application file for complete search history.

(56) References Cited

U.S. PATENT DOCUMENTS

| | | | | |
|---|---|---|---|---|
| 2007/0123086 A1* | 5/2007 | Matsunaga | ............... | B60R 7/06 439/310 |
| 2015/0028602 A1 | 1/2015 | Shimizu et al. | | |
| 2016/0097255 A1 | 4/2016 | Tamaki | | |
| 2019/0003215 A1* | 1/2019 | Stoia | ................. | E05B 83/30 |
| 2019/0023187 A1* | 1/2019 | Berta | ................. | B60R 7/06 |
| 2019/0153769 A1* | 5/2019 | Ottolini | ................. | E05F 15/70 |

FOREIGN PATENT DOCUMENTS

| | | |
|---|---|---|
| DE | 20 2015 100 607 | 3/2015 |
| EP | 0 671 529 | 9/1997 |
| KR | 10-1164664 | 7/2012 |

OTHER PUBLICATIONS

Computer translation of EP 0671529 (Year: 1995).*
Korean Examination Report dated May 30, 2019.
French Search Report dated Mar. 11, 2020.

* cited by examiner

*Primary Examiner* — Gregory A Blankenship
(74) *Attorney, Agent, or Firm* — Gerald E. Hespos; Michael J. Porco; Matthew T. Hespos

(57) ABSTRACT

A glove compartment (10) has a housing (11) and a cover (12) that is shiftable relative to the housing (11) to open or close a storage tray. A locking unit (13) either prevents or permits movement between cover (12) and housing (11). The locking unit (13) has a locking clip (14) mounted pivotably on the housing (11) and has free ends (18) that interact with locking elements (19) of the cover (12). The locking unit (13) also has an actuating element (20) mounted on the housing (11). In a first state, the actuating element (20) transfers the locking clip (14) into an unlocking position, and, in a second state, the locking clip (14) is transferable into a locking position. The locking unit (13) has an activation element (22) for the actuating element (20) to transfer the actuating element (20) between the first state and the second state.

14 Claims, 6 Drawing Sheets

GLOVE COMPARTMENT

CROSS REFERENCE TO RELATED APPLICATION

This application claims priority under 35 USC 119 to German Patent Appl. No. 10 2017 116 544.4 filed on Jul. 21, 2017, the entire disclosure of which is incorporated herein by reference.

BACKGROUND

Field of the Invention
The invention relates to a glove compartment.
Related Art
DE 20 2015 100 607 U1 discloses a glove compartment of a motor vehicle. The glove compartment has a storage tray and a cover. Whenever the cover is opened, the storage tray is accessible. Whenever the cover is closed, the storage tray is not accessible. Locking units for the cover are provided on the storage tray. The locking units either permit a movement of the cover or prevent such a movement. An electric drive connection interacts with the locking unit via a connecting element so that the locking unit is releasable by actuation of the drive device.

It is an object of the invention to provide a glove compartment with a cover that is of compact design and that can be opened and closed easily.

SUMMARY

The invention relates to a glove compartment with a locking unit that has a locking clip mounted pivotably on a housing and the free ends of which interact with locking elements of the cover. Furthermore, the locking unit comprises an actuating element that is mounted on the housing. The actuating element is configured so that in a first state the actuating element transfers the locking clip into an unlocking position. However, in a second state of the actuating element, the locking clip is transferable into a locking position. The locking unit also comprises an activation element to transfer the actuating element between the first state and the second state.

The glove compartment of the invention is configured so that a locking clip and an actuating element for the locking clip are mounted on the housing.

The actuating element of the glove compartment of the invention may be transferable between the first state and the second state via the activation element.

The free ends of the locking clip interact with locking elements of the cover. More particularly, the transfer of the locking clip into the locking position when the cover is closed causes the free ends of the locking clip to lock the locking elements of the cover so that the cover cannot be shifted relative to the housing. By contrast, whenever the locking clip takes up the unlocking position, the free ends of the locking clip release the locking elements of the cover so that the cover can then be shifted relative to the housing.

All of the assemblies of the locking unit are mounted on or fastened to the housing. Thus, the cover can be simple, compact and reliable.

The locking clip may have a U-shape with a connecting limb and two parallel limbs that extend from the connecting limb to form the free ends. The locking clip may be mounted pivotably on the housing via the limbs. The locking clip may engage in an articulated manner on the housing of the glove compartment so that the glove compartment can be opened and closed reliably with a compact design of the cover.

The actuating element may engage on a rear side of the housing and may act on the connecting limb of the locking clip. Thus, opening and closing of the glove compartment is reliable while providing a compact design of the cover.

The actuating element may have an actuating portion. In the first state, the actuating portion of the actuating element presses the connecting limb of the locking clip in a first direction counter to a spring force of a spring and thereby pivots the locking clip in a first direction to transfer the locking clip into the unlocking position. In the second state of the actuating element, the actuating portion releases the connecting limb of the locking clip, and the spring force of the spring presses the connecting limb in a second direction so that the locking clip is pivoted in a second direction and is transferable into the locking position. These details also enable the reliable opening and closing of the glove compartment with a compact design of the cover of the glove compartment.

In one embodiment, the free ends of the locking clip penetrate openings in the housing in the direction of the locking elements of the cover when the cover is in the closed state. In another embodiment, the free ends of the locking clip are concealed by the housing, and, in the closed state of the cover, the locking elements of the cover penetrate openings in the housing in the direction of the free ends of the locking clip. In the second variant of the invention, the free ends of the locking clip are concealed by the housing when the cover is open and accordingly are not visible.

The activation element can be an electric motor.

Exemplary embodiments of the invention are explained in more detail with reference to the drawing, without being restricted thereto.

DEAILED DESCRIPTION

The invention relates to a glove compartment for a motor vehicle, as is typically installed in a dashboard of a motor vehicle on a front passenger's side of the motor vehicle. FIGS. 1 to 6 show details of a glove compartment according to a first embodiment of the invention. FIGS. 7 to 14 show details of a glove compartment according to a second exemplary embodiment of the invention.

Figure 1:
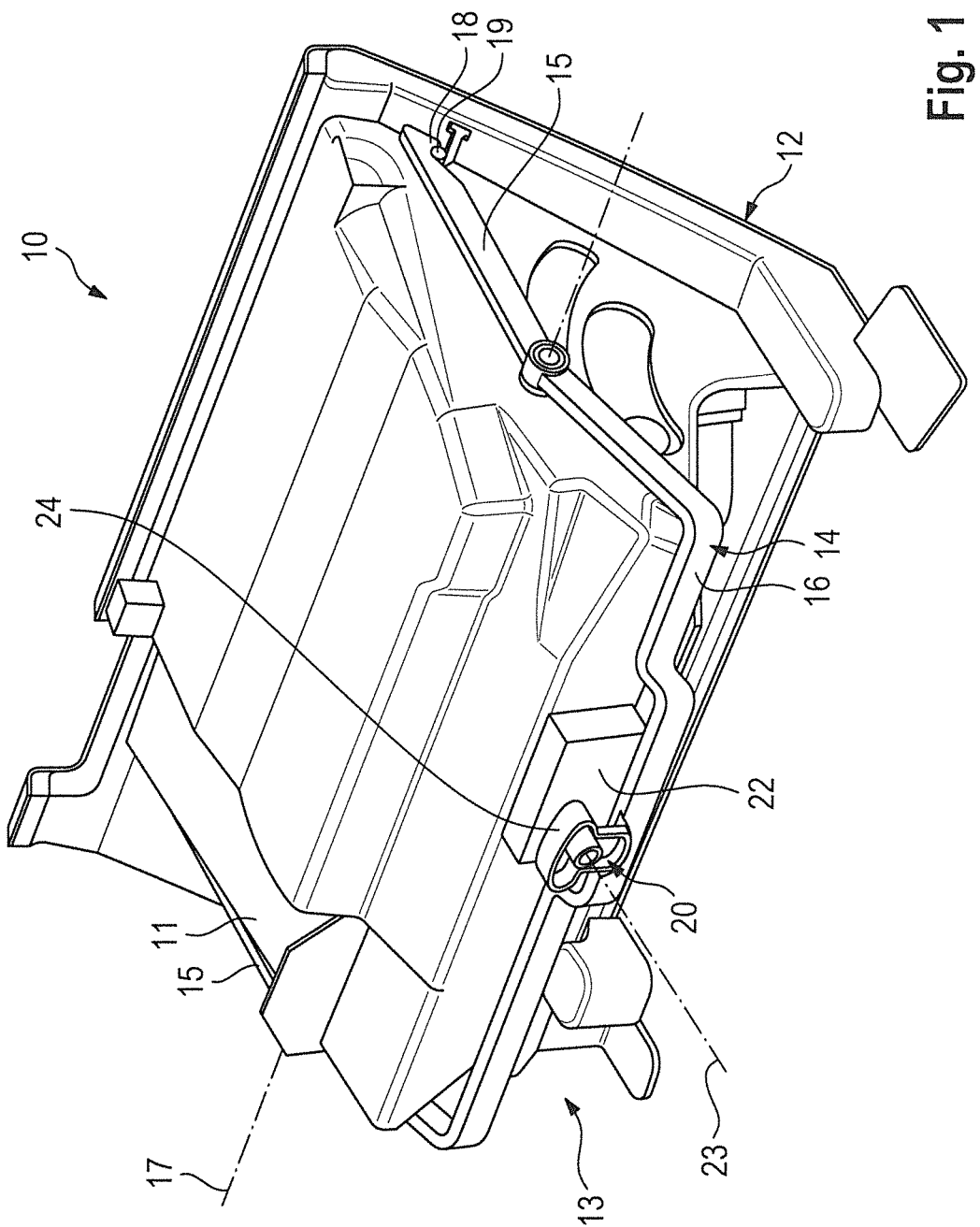
FIG. 1 shows a perspective view from the rear of a first glove compartment according to the invention in a closed state.

FIG. 1 shows a glove compartment 10 according to the invention in a closed state. The glove compartment 10 has a housing 11 and a cover 12 that can shift relative to the housing 11. The glove compartment 10 typically is mounted via the housing 11 in a dashboard of the motor vehicle on a front passenger's side. The cover 12 is shiftable relative to the housing 11, and, depending on its relative position with respect to the housing 11, the cover 12 either opens up a storage tray (not shown in FIGS. 1 to 6) of the glove compartment 10 or closes the storage tray.

The glove compartment 10 furthermore has a locking unit 13 which either prevents a relative movement of the cover 12 with respect to the housing 11 or permits such a relative movement of the cover 12 relative to the housing 11.

The locking unit 13 of the glove compartment 10 according to the invention comprises a locking clip 14 that is mounted pivotably on the housing 11.

The locking clip 14 has a substantially U-shape defined by two parallel limbs 15 that are connected to each other at one end via a connecting limb 16. The locking clip 14 is mounted to pivot or tilt on the housing 11 about a pivot axis 17 that is perpendicular to the limbs 15 and parallel to the connecting limb 16.

The limbs 15 of the locking clip 14 have free ends 18 that form hook-like elements to interact with locking elements 19 of the cover 12.

Figure 6:
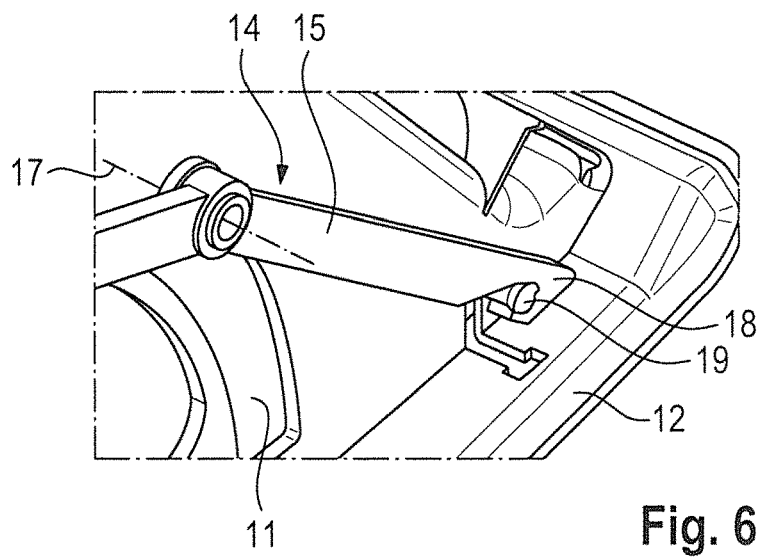
FIG. 6 shows a further detail of the glove compartment of FIG. 1.
Figure 7:
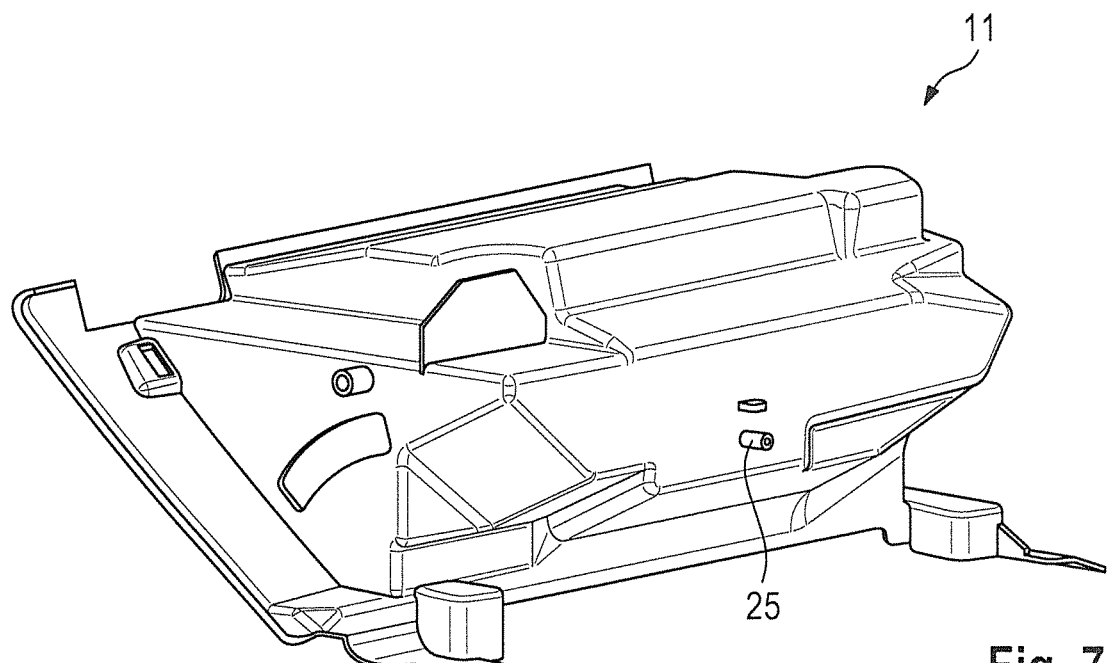
FIG. 7 shows a housing of a second glove compartment according to the invention.

The free ends 18 of the locking clip 14 can engage around the locking elements 19 of the cover 12 so that the locking clip 14 locks the cover 12 to the housing 11, as shown in FIGS. 1 and 6, to prevent relative movement between cover 12 and housing 11. By contrast, the locking clip 14 can pivot to a position where the free ends 18 of the limbs 15 of the locking clip 14 do not surround the locking elements 19 of the cover 12, thereby permitting movement of the cover 12 relative to the housing 11.

The locking unit 13 also comprises an actuating element 20 that is mounted on the housing 11. An activation element 22, an actuating portion 24 and a spring 21 also form parts of the locking unit.

The actuating element 20 is transferable between two states. In the illustrated embodiment, the actuating element 20 and the spring 21 cooperate to transfer the locking clip 14 either into a locking position or an unlocking position.

Whenever the actuating element 20 takes up a first state (see FIG. 3), the locking clip 14 is transferred into an unlocking position. By contrast, whenever the actuating element 20 takes up a second state (see FIGS. 1, 2 and 4), the locking clip 14 is transferred into a locking position.

The activation element 22 of the locking unit 13 is operative to transfer the actuating element 20 between the first state and the second state and, depending thereon, to transfer the locking clip 14 between the unlocking position and the locking position. In the illustrated embodiment, the activation element 22 is an electric motor.

In the illustrated embodiment, the actuating element 20 of the locking unit 13 is mounted rotatably on a rear side of the housing 11. More particularly, the actuating element 20 is rotatable via the activation element 22 about an axis of rotation 23 that is perpendicular to the connecting limb 16 of the locking clip 14.

Whenever the actuating element 20 is transferred by the activation element 22 into the first state (see FIG. 3), an actuating portion 24 of the actuating element 20 lies against a connecting limb 16 of the locking clip 14 and presses the connecting limb 16 of the locking clip 14 down about the pivot axis 17 in a first direction so that the free ends 18 of the limbs 15 of the locking clip 14 are moved up and out of engagement with locking elements 19 of the cover 12. Therefore, the free ends then permit a movement of the cover 12 relative to the housing 11. The actuating portion 14 of the actuating element 20 presses the connecting limb 16 of the locking clip 14 down counter to the spring force of the spring 21 into the unlocking position.

Figure 2:
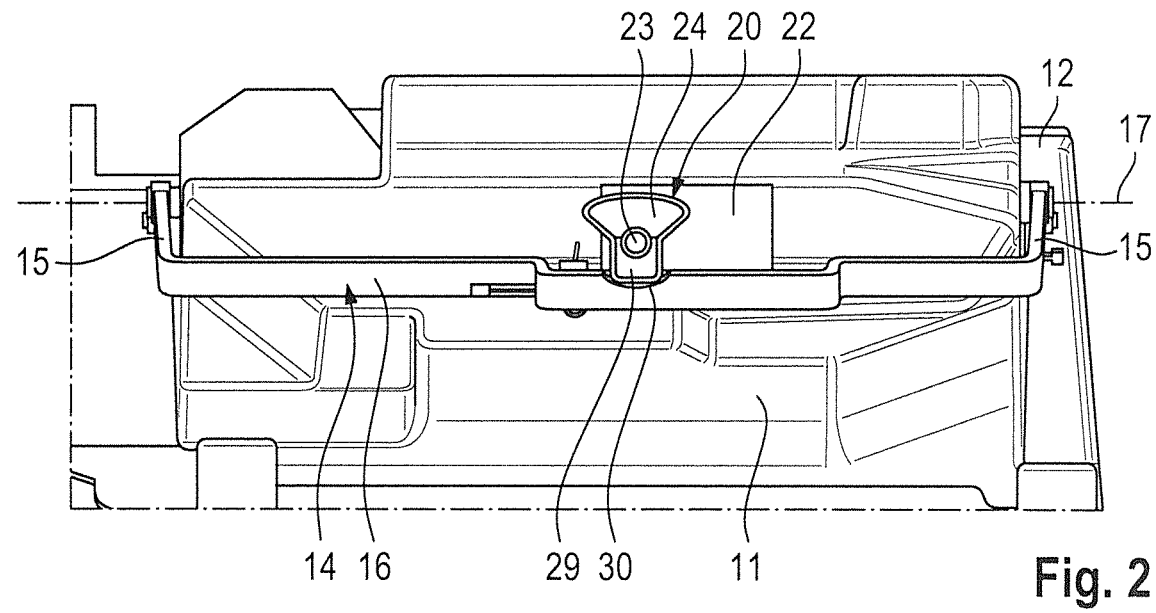
FIG. 2 shows a detail of the glove compartment of FIG. 1 from the rear.
Figure 3:
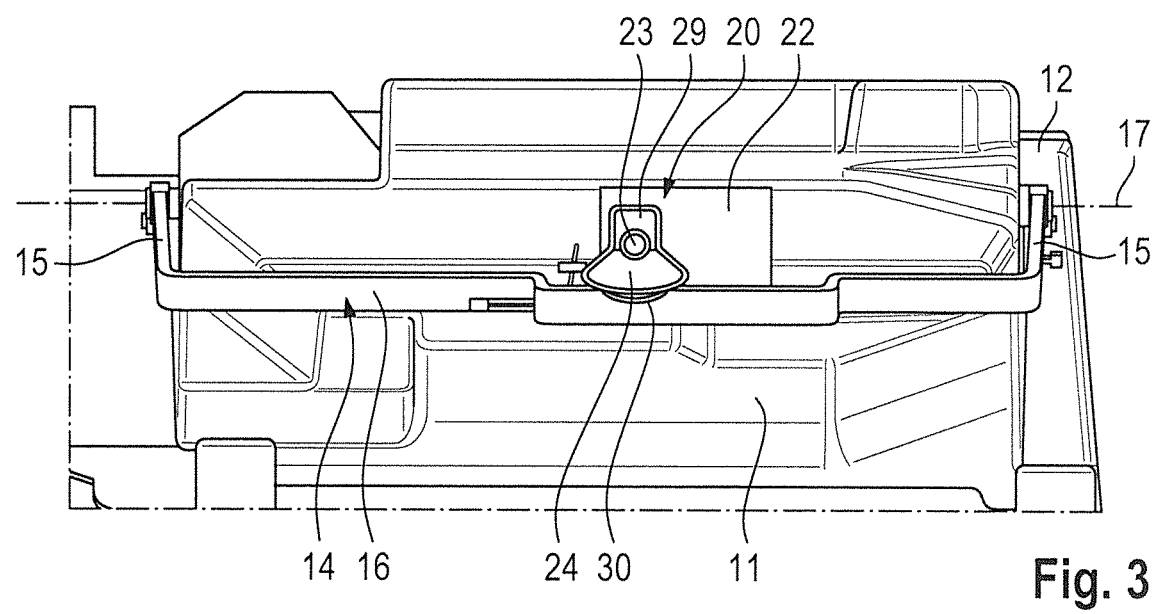
FIG. 3 shows the detail of FIG. 2 in an open state of the glove compartment.
Figure 4:
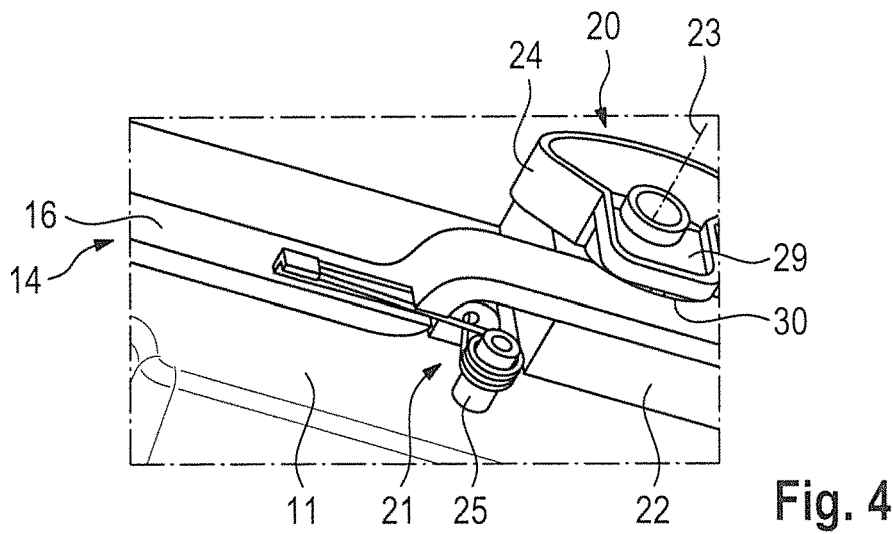
FIG. 4 shows a detail of FIG. 3 obliquely from below.

The actuating element 20 can be rotated via the activation element 22 by 180° in relation to the first state of FIG. 3 into the second state of FIGS. 1, 2 and 4. Thus, the actuating portion 24 of the actuating element 20 does not engage the connecting limb 16 of the locking clip 14. Rather, the actuating element 20 releases the locking clip 14 so that the spring force of the spring 21 pivots the locking clip 14 about the pivot axis 17. Accordingly, the connecting limb 16 pivots up and the opposite free ends 18 of the limbs 15 of the locking clip 14 move down so that the locking clip 14 takes up its locking position. Whenever the cover 12 is transferred into the closed position shown in FIGS. 1 to 6, the free ends 18 of the limbs 15 of the locking clip 14 engage around the locking elements 19 of the cover 12.

As shown in FIG. 4, the spring 21 is wound spirally around a projection 25 on the rear side of the housing 11. The spring 21 is supported at one end on the connecting limb 16 of the locking clip 14 and at the other end on the housing 11 so that the spring force of the spring 21 presses the connecting limb 16 of the locking clip 14 up and presses the free ends 18 of the limbs 15 of the locking clip 14 down. Thus, the spring 20 ultimately presses the locking clip 14 into a locking position.

Figure 5:
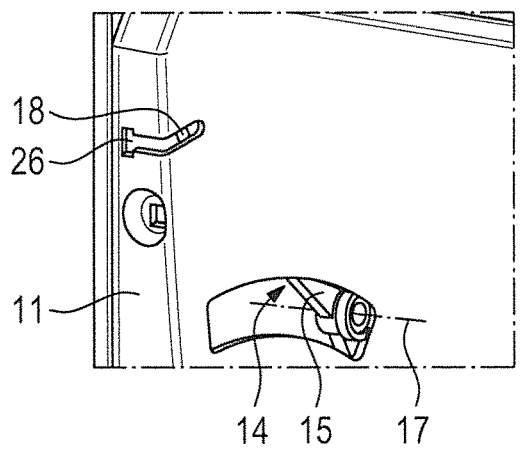
FIG. 5 shows a further detail of the glove compartment of FIG. 1.

In the embodiment of FIGS. 1 to 6, the free ends 18 of the parallel limbs 15 of the locking clip 14 are concealed by the housing 11 so that the free ends 18 are not visible even when the cover 12 is open (see FIG. 5). The free ends 18 of the parallel limbs 15 of the locking clip 14 must be brought into engagement with the locking elements 19 of the cover 12 when the cover 12 is closed. Accordingly, openings 26 are introduced into the housing 11 adjacent to the free ends 18 of the locking clip 14, and the locking elements 19 of the cover 12 are insertable into the openings 26 during the closing of the cover 12 to bring the locking elements 19 of the cover 12 into engagement with the free ends 18 of the locking clip 14. In the embodiment of FIGS. 1 to 6, the locking elements 19 of the cover 12 are pin-like projections that have free ends via which the projections can ultimately engage in the openings 26 in the housing 11.

Accordingly, the glove compartment 10 of the embodiment of FIGS. 1 to 6 has the housing 11 and the cover 12 that is shiftable relative to the housing 11. A locking unit 13 engages on the housing 11 and has the locking clip 14 that is articulated pivotably on the housing 11. The locking clip 14 is pivotable about the pivot axis 17 that extends transversely with respect to the longitudinal direction of the vehicle or in the transverse direction of the vehicle.

The locking unit 13 also comprises the actuating element 20 and the activation element 22. Whenever the activation element 22 transfers the actuating element 20 into the first state (see FIG. 3), the locking clip 14 takes up an unlocking position. By contrast, whenever the activation element 22 transfers the actuating element 20 into the second state (see FIGS. 1, 2 and 4), the locking clip 14 takes up its locking position in which free ends 18 of the parallel limbs 15 of the locking clip 14 surround the locking elements 19 of the cover 12 when the cover 12 is closed and thus lock the cover 12 in its closed position.

The actuating element 20 is fastened rotatably to the housing 11 and is an eccentric element that is of asymmetrical design with respect to its axis of rotation 23. The actuating element 20 has the actuating portion 24 which, in the first state (see FIG. 3), presses the connecting limb 16 of the locking clip 14 down and, in the second state (see FIGS. 1, 2 and 4), releases the connecting limb 16 of the locking clip 14.

In the first state of the actuating element 20, the actuating portion 24 lies against the connecting limb 16 of the locking clip 14 and presses same down.

In the second state of the actuating element 20, the actuating portion 24 of the actuating element 20 does not lie against the connecting limb 16 of the locking clip 14. On the contrary, in the second state of the actuating element 20, a portion 29 of the actuating element 20 that lies opposite the actuating portion 24 of the actuating element 20 enters a groove 30 in the shape of a circular segment in the connecting limb 16 of the locking clip 14.

The portion 29 of the actuating element 20 that lies opposite the actuating portion 24 of the actuating element 20 is designed as an eccentric, and the groove 30 in the connecting limb 16 is in the shape of a circular segment. The portion 29 enters the groove 30 in the second state of the actuating element 20 and thus releases the connecting limb 16 of the locking clip 14. Thus, the spring 21 presses the connecting limb 16 up and the free ends 18 of the parallel limbs 15 of the locking clip 14 move down into the locking position.

The contour of the portion 29 of the actuating element 20 is adapted to the contour of the groove 30 so that the portion 29 of the actuating element 20 is insertable into the groove 30. By contrast, the actuating portion 24 of the actuating element 20 is larger size and is not insertable into the groove 30 of the connecting limb 16.

FIGS. 7 to 14 show a glove compartment 10 according to a second embodiment of the invention. The basic design of the glove compartment 10 of FIGS. 7 to 14 corresponds to the basic design of the glove compartment 10 of FIGS. 1 to 6, and therefore the same reference signs are used for identical assemblies to avoid unnecessary repetitions. Only details by which the embodiment of FIGS. 7 to 14 differs from the embodiment of FIGS. 1 to 6 will be discussed below, and the two embodiments correspond in respect of the remaining details, and therefore reference is made to the statements regarding the embodiment of FIGS. 1 to 6.

Figure 8:
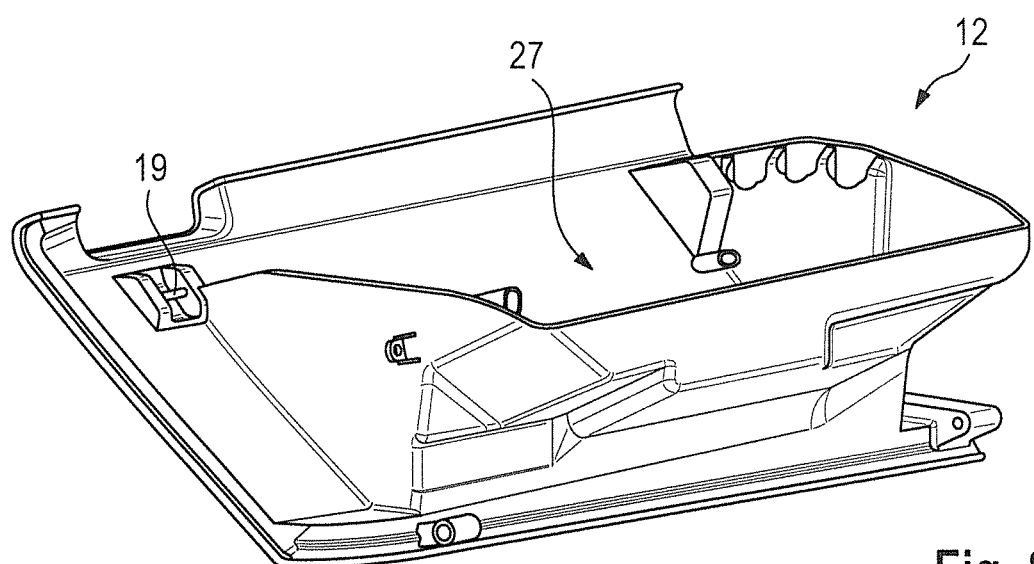
FIG. 8 shows a cover of the second glove compartment according to the invention.
Figure 9:
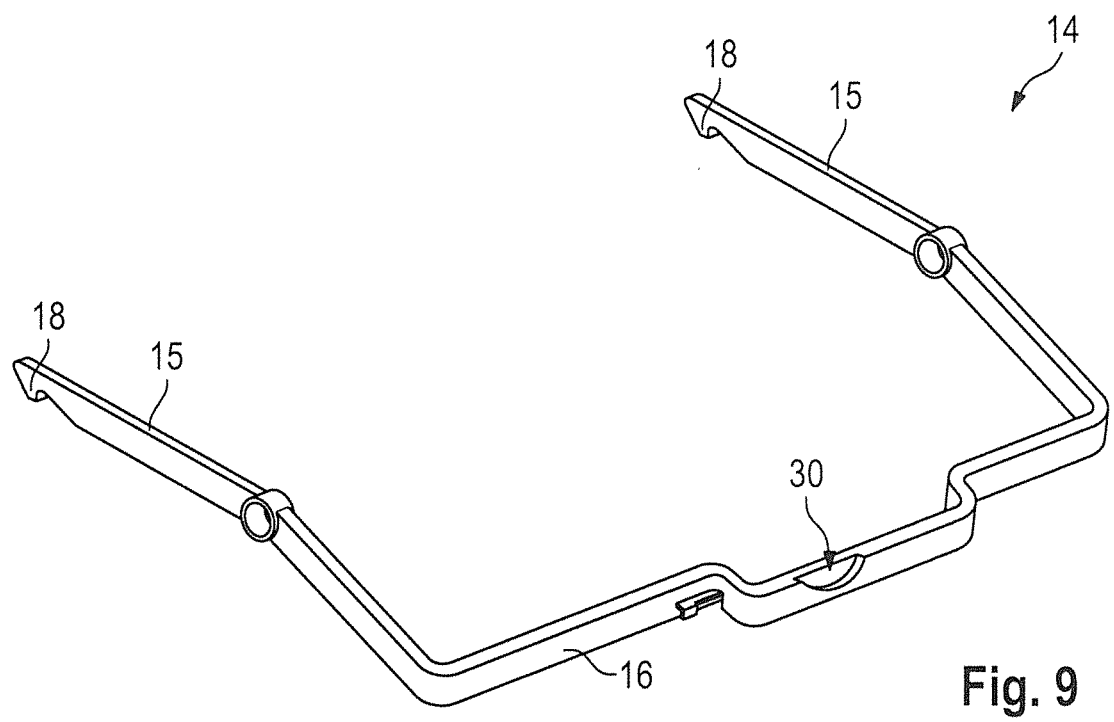
FIG. 9 shows a locking clip of the second glove compartment according to the invention.
Figure 10:
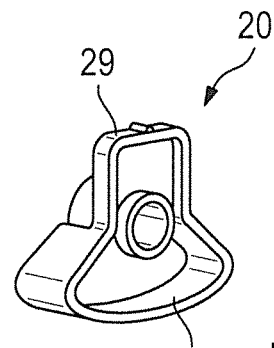
FIG. 10 shows an actuating element of the second glove compartment according to the invention.
Figure 11:
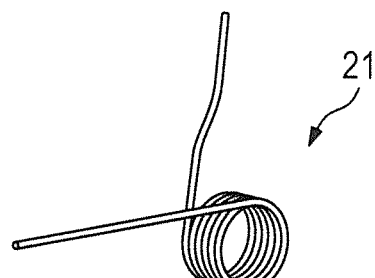
FIG. 11 shows a spring element of the second glove compartment according to the invention.
Figure 12:
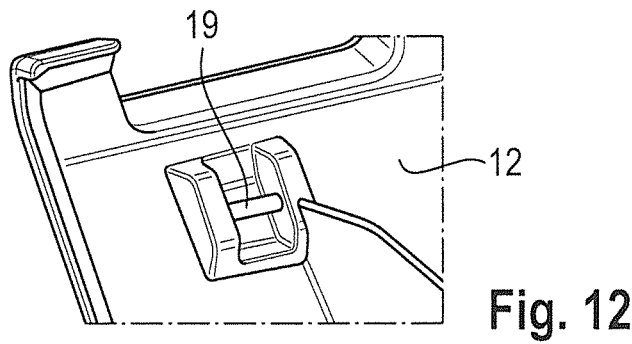
FIG. 12 shows a detail of the cover of FIG. 8.
Figure 13:
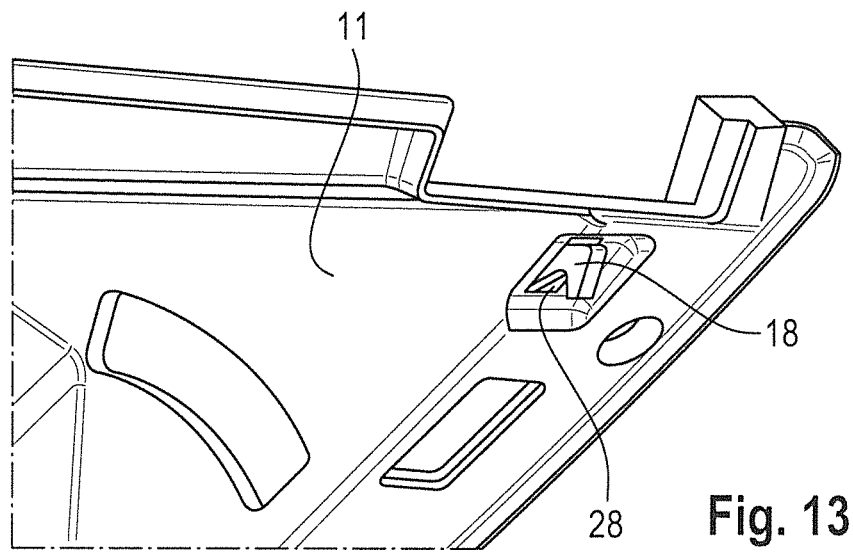
FIG. 13 shows a detail of the housing of FIG. 7 together with the clip.
Figure 14:
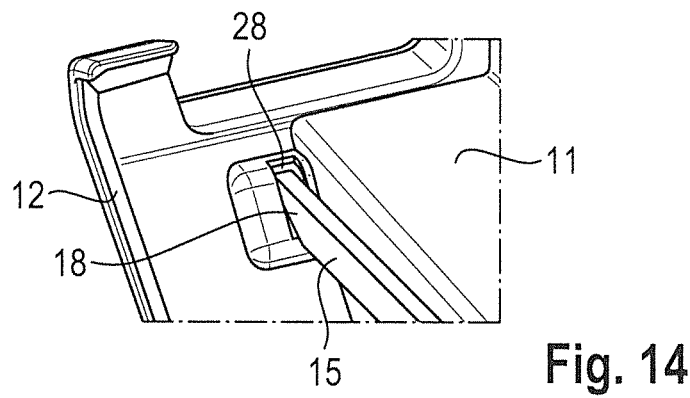
FIG. 14 shows a detail of the second glove compartment according to the invention in a closed state.

In contrast to FIG. 1, FIGS. 7, 8, 9, 10 and 11 show the essential assemblies of the glove compartment 10 on their own. In particular, FIG. 8 shows a storage tray 27 that is provided by the cover 12.

The exemplary embodiment of FIGS. 7 to 14 differs from the exemplary embodiment of FIGS. 1 to 6 in that the free ends 18 of the parallel limbs 15 of the locking clip 14 penetrate openings 28 in the housing 11 such that the free ends 18 of the locking clip 14 are visible when the cover 12 is open.

During the closing of the cover 12, the locking elements 19 are therefore not moved through openings in the housing 11 in the direction of the free ends 18 of the locking clip 14. On the contrary, the free ends 18 of the locking clip 14 that extend through the openings 18 in the housing 11 can directly grasp locking elements 19 of the cover 12.

In contrast to the exemplary embodiment of FIGS. 1 to 6, it is therefore not necessary in the embodiment of FIGS. 7 to 14 for the locking elements 19 to be pin-like projections. On the contrary, in the embodiment of FIGS. 7 to 14, the locking elements 19 of the cover 12 can be bordered at both ends by the cover 12.

With regard to all other details, the exemplary embodiment of FIGS. 7 to 14 corresponds to the exemplary embodiment of FIGS. 1 to 6, and therefore reference is made to the above explanations in order to avoid unnecessary repetitions.

What is claimed is:

1. A glove compartment, comprising:
   a housing;
   a cover that is shiftable relative to the housing and, depending on its relative position with respect to the housing, either opens or closes a storage tray; and
   a locking unit that either prevents a relative movement between cover and housing or permits a relative movement between cover and housing, the locking unit includes:
   a U-shaped locking clip with two parallel limbs extending from a connecting limb and having free ends, the locking clip being mounted pivotably on the housing such that a pivot axis of the locking clip extends perpendicularly to the limbs and parallel to the connecting limb, the locking clip having free ends that interact with locking elements of the cover,
   an actuating element mounted on the housing and movable between a first state where the actuating element transfers the locking clip into an unlocking position, and in a second state where the locking clip is transferable into a locking position, and
   an activation element configured to transfer the actuating element between the first state and the second state.

2. The glove compartment of claim 1, wherein the actuating element engages on a rear side of the housing and in the first state acts on the connecting limb of the locking clip.

3. The glove compartment of claim 2, wherein the actuating element engages rotatably on a rear side of the housing, and an axis of rotation of the actuating element is perpendicular to the connecting limb of the locking clip.

4. A glove compartment, comprising:
   a housing;
   a cover that is shiftable relative to the housing and, depending on its relative position with respect to the housing, either opens or closes a storage tray; and
   a locking unit that either prevents a relative movement between cover and housing or permits a relative movement between cover and housing, the locking unit includes:
   a U-shaped locking clip with two parallel limbs extending from a connecting limb and having free ends, the locking clip being mounted pivotably on the housing via the parallel limbs, the locking clip having free ends that interact with locking elements of the cover,
   an actuating element mounted on the housing and movable between a first state where the actuating element transfers the locking clip into an unlocking position, and in a second state where the locking clip is transferable into a locking position, and
   an activation element configured to transfer the actuating element between the first state and the second state,
   wherein the actuating element has an actuating portion, the actuating portion being configured, so that:
   in the first state of the actuating element, the actuating portion transfers the locking clip into the unlocking position by the actuating portion presses the connecting limb of the locking clip in a first direction counter to a spring force of a spring and thereby pivots the locking clip in a first direction and into the unlocking position, and in the second state of the actuating element, the locking clip is transferable into the locking position by the actuating portion, releases the connecting limb of the locking clip and the spring force of the spring presses the connecting limb in a second direction and thereby pivots the locking clip in a second direction and into the locking position.

5. The glove compartment of claim 4, wherein the actuating element is an eccentric element.

6. A glove compartment, comprising:

a housing;

a cover that is shiftable relative to the housing and, depending on its relative position with respect to the housing, either opens or closes a storage tray; and a locking unit that either prevents a relative movement between cover and housing or permits a relative movement between cover and housing, the locking unit includes:

a locking clip mounted pivotably on the housing, the locking clip having free ends that interact with locking elements of the cover, an actuating element mounted on the housing and movable between a first state where the actuating element transfers the locking clip into an unlocking position, and in a second state where the locking clip is transferable into a locking position, and an activation element configured to transfer the actuating element between the first state and the second state, wherein the free ends of the locking clip penetrate openings in the housing in the direction of the locking elements of the cover.

7. The glove compartment of claim 6, wherein the locking clip is of U-shape with two parallel limbs extending from a connecting limb and having free ends, the locking clip being mounted pivotably on the housing via the parallel limbs.

8. The glove compartment of claim 7, wherein a pivot axis of the locking clip extends perpendicularly to the limbs and parallel to the connecting limb.

9. A glove compartment, comprising:

a housing;

a cover that is shiftable relative to the housing and, depending on its relative position with respect to the housing, either opens or closes a storage tray; and a locking unit that either prevents a relative movement between cover and housing or permits a relative movement between cover and housing, the locking unit includes:

a locking clip mounted pivotably on the housing, the locking clip having free ends that interact with locking elements of the cover, an actuating element mounted on the housing and movable between a first state where the actuating element transfers the locking clip into an unlocking position, and in a second state where the locking clip is transferable into a locking position, and an activation element configured to transfer the actuating element between the first state and the second state, wherein the free ends of the locking clip are concealed by the housing, and, in the closed state of the cover, the locking elements of the cover penetrate openings in the housing in a direction of the free ends of the locking clip.

10. The glove compartment of claim 9, wherein the locking clip is of U-shape with two parallel limbs extending from a connecting limb and having free ends, the locking clip being mounted pivotably on the housing via the parallel limbs.

11. The glove compartment of claim 10, wherein a pivot axis of the locking clip extends perpendicularly to the limbs and parallel to the connecting limb.

12. A glove compartment, comprising:

a housing;

a cover that is shiftable relative to the housing and, depending on its relative position with respect to the housing, either opens or closes a storage tray; and a locking unit that either prevents a relative movement between cover and housing or permits a relative movement between cover and housing, the locking unit includes:

a locking clip mounted pivotably on the housing, the locking clip having free ends that interact with locking elements of the cover, an actuating element mounted on the housing and movable between a first state where the actuating element transfers the locking clip into an unlocking position, and in a second state where the locking clip is transferable into a locking position, and an activation element configured to transfer the actuating element between the first state and the second state, wherein the activation element is an electric motor.

13. The glove compartment of claim 12, wherein the locking clip is of U-shape with two parallel limbs extending from a connecting limb and having free ends, the locking clip being mounted pivotably on the housing via the parallel limbs.

14. The glove compartment of claim 13, wherein a pivot axis of the locking clip extends perpendicularly to the limbs and parallel to the connecting limb.

* * * * *